United States Patent [19]

Bro

[11] 4,200,684
[45] Apr. 29, 1980

[54] HIGH RATE DISCHARGE PRIMARY BATTERY

[75] Inventor: Per Bro, Andover, Mass.

[73] Assignee: P. R. Mallory & Co. Inc., Indianapolis, Ind.

[21] Appl. No.: 963,658

[22] Filed: Nov. 24, 1978

[51] Int. Cl.² .............................................. H01M 2/38
[52] U.S. Cl. ....................................... 429/51; 429/70; 429/81; 429/94; 429/128; 429/196
[58] Field of Search ...................... 429/51, 70, 81, 196, 429/218, 128, 94

[56] References Cited

U.S. PATENT DOCUMENTS

| | | |
|---|---|---|
| 1,376,257 | 4/1921 | Cook . |
| 2,584,117 | 2/1952 | Elrod, Jr. ............................... 136/159 |
| 2,932,681 | 4/1960 | Solomon ............................... 136/160 |
| 3,238,070 | 3/1966 | Porter .................................... 136/160 |
| 3,290,176 | 12/1966 | Berju et al. ........................... 136/160 |
| 3,463,671 | 8/1969 | Doll et al. ............................. 136/160 |
| 3,713,888 | 1/1973 | Symons .................................... 136/6 |
| 3,877,996 | 4/1975 | Belletete ............................... 136/160 |
| 3,935,024 | 1/1976 | Symons ................................ 136/6 E |
| 3,940,283 | 2/1976 | Symons ..................................... 136/6 |
| 3,953,239 | 4/1976 | Anderson ......................... 136/100 R |
| 3,967,589 | 7/1976 | Papineau ............................... 122/4 R |
| 3,993,502 | 11/1976 | Bjorkman, Jr. ........................ 429/51 |
| 3,996,064 | 12/1976 | Thaller ............................... 429/23 X |
| 4,020,238 | 4/1977 | Symons .................................. 429/15 |
| 4,025,697 | 5/1977 | Hart ....................................... 429/70 |
| 4,040,938 | 8/1977 | Robertson ............................ 204/283 |

Primary Examiner—Charles F. LeFevour
Attorney, Agent, or Firm—Ronald S. Cornell; Israel Nissenbaum; Martin M. Glazer

[57] ABSTRACT

A method for cooling high rate discharge primary batteries comprising absorbing the heat of reaction of the primary battery by a nonaqueous liquid depolarizer, circulating it, cooling it, and returning it to the primary battery, and a primary battery system including one or more primary batteries, a cooling means, and a fluid communication means between the primary battery and the cooling means.

28 Claims, 8 Drawing Figures

HIGH RATE DISCHARGE PRIMARY BATTERY

FIELD OF THE INVENTION

This invention is related to high rate discharge primary batteries, and more particularly to those batteries containing a nonaqueous liquid depolarizer.

BACKGROUND OF THE INVENTION

Nonaqueous, liquid depolarizer, high rate discharge, primary batteries are similar in many respects to other primary batteries, they comprise at least one high rate discharge cell, with each cell comprising an anode, a cathode current collector, a separator between the anode and the cathode current collector, and a substance which is both a nonaqueous liquid depolarizer and an electrolyte solvent. The liquid depolarizer in high rate batteries is in direct contact with the anode, as opposed to conventional cells where the anode and cathode depolarizer must be physically separated.

When a high rate primary cell, as any electrochemical cell, produces electrical energy it also produces heat. Heat is generated within the cell at a site of heat generation. The main site of heat generation is located at the point where the chemical reaction producing the electrical energy occurs, in a high rate cell this point is where the liquid cathode contacts the anode and the cathode current collector. Heat is also generated in the electrolyte and in all of the electrically conductive elements of the cell by ohmic heating.

In small, low capacity cells and batteries, the heat generated is minute and easily dissipated into the environment. As batteries become larger and increase in capacity, the heat generated increases and becomes more of a problem. In liquid depolarizer, high rate primary batteries, such as those with a capacity of from 100 ampere hours to 10,000 ampere hours or more, the problem becomes critical. Unless the heat of reaction generated by the primary battery can be removed quickly and in sufficient amounts, thermal runaway may occur with disastrous results.

THE INVENTION

It has now been discovered that a substance which is both a nonaqueous liquid depolarizer and liquid cathode of a high rate discharge battery can also be used to absorb the internal heat generated by the battery at the site of heat generation and thus cool the battery and prevent thermal runaway. The substance reacts with the anode and at the cathode producing heat and electrical energy, and then absorbs and removes the heat from the site of heat generation. The substance, after absorbing the heat of reaction is removed either mechanically, as by means of a pump, or through the use of convection currents, to a cooling means such as a heat exchanger. The hot substance is then cooled and the cooled substance is recycled to the primary battery where it again absorbs the heat of reaction.

Circulation of an aqueous electrolyte by convection currents to cool a secondary battery is known. It has been disclosed as being useful in lead acid storage batteries used in automobiles. In the high rate discharge primary batteries of the invention, the nonaqueous substance is circulated to cool a primary battery. The circulation keeps the substance at a relatively low temperature allowing the battery to operate properly. Keeping the substance relatively cool prevents thermal runaway of the battery and also prevents excessive internal battery pressures that can cause an explosion. The site of heat generation within the battery, when used with the preferred electrolytes is kept below about 90° C., and preferably below about 70° C. by the invention. The primary battery may be sealed to allow an increase of pressure within the battery, which raises the boiling point of the substance, and prevents loss of the electrolyte. The operating temperature of the battery can now be raised, but a vent may be necessary to protect against execssive pressures. The battery because of the low freezing point of the preferred electrolytes functions satisfactorily at ambient temperatures down to about −60° C.

The preferred embodiment of the invention is a primary battery system comprised of three major components: a primary battery, a cooling means, and a fluid communication means between the primary battery and the cooling means. The primary battery is comprised of at least one primary cell with each cell comprising an anode, a cathode current collector with a separator therebetween, a liquid depolarizer, and circulatory structure, which structure may be a part of the anode and/or cathode current collector.

The anode includes an active part which may be made of almost any metal. The preferred metals are those of the alkali and alkaline earth metals, and aluminum. Lithium is the most preferred of these metals. The exact structure of the anode varies with each specific embodiment and these structures are discussed in relation to these embodiments.

The cathode electrode is a current collector with the depolarizer reacting at the cathode current collector to generate power. The exact structure of the cathode current collector varies with each specific embodiment and these structures are discussed in relation to these embodiments.

The active cathode of the primary cell is the nonaqueous liquid depolarizer, which liquid is in direct contact with the anode. The liquid depolarizer can be either a single compound or it can be a solution of various compounds. These compounds though, must all be nonaqueous since many of the materials used in high rate cells are very reactive with water. The preferred liquid depolarizer consists of a material selected from the group consisting of liquid oxyhalides, liquid nonmetallic oxides, liquid nonmetallic halides, and mixtures thereof, such as phosphorous oxychloride ($POCl_3$), selenium oxychloride ($SeOCl_2$), sulfur dioxide ($SO_2$), sulfur trioxide ($SO_3$), vanadium oxytrichloride ($VOCl_3$), chromyl chloride ($CrO_2Cl_2$), sulfuric oxychloride ($SO_2Cl_2$), nitryl chloride ($NO_2Cl$), nitrosyl chloride ($NOCl$), nitrogen dioxide ($NO_2$), sulfur monochloride ($S_2Cl_2$), sulfur monobromide ($S_2Br_2$), vanadium oxytrichloride ($VOCl_3$), and chromyl chloride ($CrO_2Cl_2$) and thionyl chloride ($SOCl_2$). Each of the above compounds can be used in any combination with each other or used separately or used with thionyl chloride ($SOCl_2$) as the depolarizer. Each of the above, either alone or as cosolvents will dissolve a suitable electrolyte such as lithium aluminum chloride ($LiAlCl_4$).

The structure of the separator between the anode and cathode varies with each embodiment in which it is used. The separator in the present invention keeps the anode current collector and cathode current collector physically separated.

The circulatory structure within the primary battery comprises a series of channels or similar structure whose exact configuration depends on the specific embodiment of the invention. The structure in each embodiment allows the substance to come into contact will all the areas of the site of heat generation of the primary battery, to absorb the heat of reaction and to carry it away.

The substance must be in contact with all areas where heat is generated and must be circulated in a sufficient volume to effectively carry off the heat present, otherwise local areas of high heat concentration can occur, damaging the primary battery. In order to prevent thermal runaway of the primary battery, the substance circulating through the primary battery should be able to remove from about 1000 calories to about 9000 calories per ampere hour of battery capacity.

The channels or similar circulatory structures are also important in that they supply a constant stream of fresh depolarizer to the anode. The constant supply of fresh depolarizer increases the rate of generation of electricity by the battery.

A flowing supply of fresh depolarizer insures that the rate of generation of electricity is enhanced by virtue of electrolyte motion since it can be pumped in from a source outside of the battery. The specific circulatory structures vary from one embodiment to another, and are described in relation to each embodiment.

A casing is an additional item which can be part of the primary battery. A casing is not required since the battery can be an internal component of a larger system with the other components forming a compartment for the primary battery. The casing may simply be a metallic outer shell, or it can be any other structure that can be used to encase the primary battery. In the preferred embodiment, the casing of the primary battery is an outer shell. This outer shell is capable of serving many purposes depending on the specific embodiment of the invention. It can be there simply to protect the other parts of the primary battery from physical damage, and it can also be used to confine the substance within the area of the anode and cathode current collector. Further, the shell can be used as a cooling means, by having the substance that is carrying the heat circulate past the outer shell, come into contact with it, and transfer heat to it. The heat is then dissipated from the case into the environment by radiation and/or convection.

The amount of heat being transferred to the case is partially dependant on the volume of depolarizer passing along the casing per unit of time. By the use of various battery structures the volume of depolarizer passing along the casing can be controlled, thus controlling the amount of heat transferred to the casing. Through these variations in battery structure the degree of cooling of the battery can be partially controlled.

The cooling capacity of the outer shell can be increased by adding fins to the outer surface of the outer shell. The fins increase the surface area of the outer shell, which in turn increases the area where heat transfer takes place. The increased heat transfer area increases the amount of heat exchanged per unit of time to the environment, which in turn produces a cooler depolarizer and a cooler primary battery.

Other parts of the primary battery system may also be contained within the outer shell, such as all or part of the fluid communication means and parts of the cooling means.

From the primary battery, the substance circulates to the cooling means and back to the primary battery. The circulation is accomplished through the use of a fluid communication means, whose exact structure varies with each embodiment of the invention. The physical structure of the fluid communication means can vary from a simple opening in a seal, or a passageway, to a relatively sophisticated system of pumps, filters, valves, and piping. The function of the communication means is to carry the relatively hot substance from the primary battery to the cooling means and back to the primary battery.

The force pushing the substance through the fluid communication means can be provided by a pump placed almost anywhere within the primary battery system. Convection currents can also supply the force for circulating the substance. The convection currents are produced by the difference in temperatures between the relatively hot anode and cathode current collector area, and the relatively cold cooling means. Because of the tendency of a hot liquid to rise and a cold liquid to sink, a current is set up by the motion of these liquids which causes the substance to circulate throughout the primary battery.

The cooling means removes thermal energy from the depolarizer. Almost any heat exchanger with its associated piping known in the art which will remove thermal energy from a liquid can be used as a cooling means. These various heat exchangers can vary from the outer shell of the primary battery to an elaborate heat exchanger cooled by either a gas or a liquid. The substance can also be cooled by radiating heat into the environment. The only requirement is that the heat exchanger used be able to remove between about 1000 and 9000 calories per ampere hour of battery capacity.

Even though only a single primary battery, a single fluid communication means, and a single cooling means have been discussed thus far, there is no restriction as to the number of these items actually present within the battery system. Two or more primary batteries may be connected in series within one outer shell or in separate shells to increase the capacity of the battery system. There can also be more than one heat exchanger in the cooling means and also more than one type of heat exchanger in the cooling means present in the battery systems. The same is also true for the fluid communication means between the primary cell and the cooling means, there can be alternate means within the battery system which can be controlled by valves or the like.

After passing through the cooling means the cooled substance is then recycled to the area of the anode and cathode current collector via the fluid communication means. The cooled substance then is able to react again and absorb the heat of reaction of the primary battery.

Many times the high rate battery will be held in reserve, and no depolarizer will be present inside the primary battery, instead the depolarizer will be stored in a reservoir. When the battery is used, the depolarizer is pumped from the reservoir into the primary battery. The reservoir can be part of the fluid communication means between the primary battery and the cooling means, or it can be a separate component of the primary battery system. The specific location of the reservoir depends on the specific embodiment used.

These and various other features of the invention as well as many specific advantages will be more fully apparent from a detailed consideration of the remainder of this disclosure and the drawings.

DETAILED DESCRIPTION OF THE DRAWINGS

Figure 1:
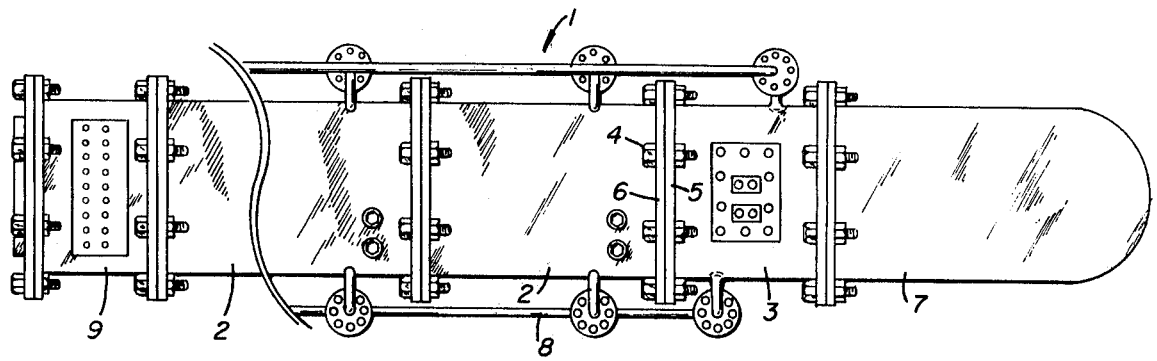
FIG. 1 is a schematic view of a high rate discharge primary battery.

Referring to the drawings, FIG. 1 is a schematic view of a high rate discharge primary battery 1. The primary battery 1 is comprised of one or more power modules 2 in which an anode and cathode (not shown) are located and where electrical energy is generated. A hydraulic section 3 is shown attached to one power module 2 by bolts 4 through flanges 5, 6 of the hydraulic section 3 and power module 2 respectively. The hydraulic section 3 contains the various valves and assorted structure (not shown) which channel the flow of the depolarizer through the various sections of the primary battery 1.

A depolarizer reservoir 7 is shown at one end of the primary battery 1. The depolarizer is pumped from the reservoir 7 through the hydraulic section 3 into the power modules 2. From the power modules 2 it is pumped to the cooling means (not shown) and then back to the reservoir 7. The depolarizer flows between these various sections through pipes 8.

The various functions of the battery 1 such as opening and closing of valves in the hydraulic section 3, and the pumping of depolarizer from the reservoir 7 into the modules 2 is controlled by a control section 9. The control section 9 is shown at the end of the battery 1 opposite the reservoir 7.

Figure 2:
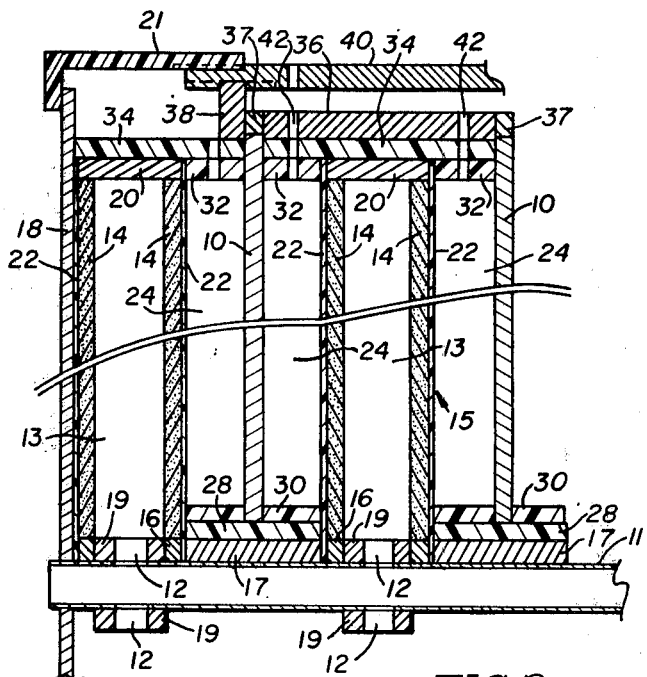
FIG. 2 is a schematic diagram of a segment of the interior of a power module of one embodiment of a primary battery.

In FIG. 2 we see a schematic diagram of a segment of the interior of a power module of one embodiment of a primary battery. In this segment the depolarizer (not shown) contacts an anode 10 and cathode current collector 15 generating heat and electricity. The depolarizer enters the segment by flowing through a hollow tube or conduit 11 then through a perforation 12 in the hollow tube or conduit 11 into a flow channel 13. The channel 13 is located in between two disks 14 comprising a porous, double leaf disk cathode current collector 15. The hollow tube or conduit 11 also serves as a current collector, being electrically connected to the porous cathode current collector 15 through a cathode retaining ring 16, a cathode current collector 17, and a cathode master current collector 18. The porous cathode current collector 15 is held in place by an inner cathode ring 19, an outer cathode ring 20, and the cathode retaining ring 16. The master current collector 18 is held in place by an insulating retainer 21.

The depolarizer flows from the flow channel 13 through the porous cathode current collector 15 and a porous separator 22, into interelectrode hydraulic guides 24. The guides 24 are between the separator 22 and the single leaf disk anode 10, which anode 10 contains a central hole (not shown). The depolarizer is now in contact with the anode 10 and cathode current collector 15 and reacts with the anode 10 and the cathode current collector 15 generating heat and electrical energy.

The anode 10 is electrically isolated from the cathode current collector 17 by a first insulator 28. The anode 10 is held in place by a second insulator 30 and third insulator 32. A fourth insulator 34 electrically separates the anode 10 and the porous cathode current collector 15, and also separates an anode current collector 36 from the porous cathode current collector 15. An anode retaining ring 37 helps to hold the anode 10 in place and electrically connects the anode 10 to the anode current collector 36. A retainer 38 electrically connects the anode current collector 36 to an anode master current collector 40. The insulating retainer 21 and the retainer 38 hold the anode master current collector 40 in position.

The depolarizer after reacting with the anode 10 and the cathode current collector 15, generating heat and electrical energy and, absorbing the heat of reaction, flows from the interelectrode hydraulic guide 24 through an aperature 42 in the third insulator 32, the fourth insulator 34 and the anode current collector 36, towards the fluid communication means (not shown). The electrical output of the battery is taken from the anode master current collector 40 and the cathode master current collector 18.

The primary battery is assembled by stacking alternate layers of porous cathode current collectors 15 with their associated flow channels 13, separators 22, anodes 10 with their associated interelectrode hydraulic guides 24, and assorted insulators, along the hollow tube 11. The hollow tube 11 passes through the central hole of each element of the battery. Although the embodiment shown has peripheral anode collectors 36 and central cathode collectors 17, it is sometime convenient to use peripheral cathode collectors (not shown) and central anode collectors (not shown) to effect a more favorable current distribution in the cells. In such an embodiment, the hollow tube 11 would be electrically connected to the anodes 10 and insulated from the cathode current collectors 15 and act as a second current collector. The cathode current collectors 15 in this alternate embodiment would be connected to a peripheral master cathode current collector (not shown).

Figure 4:
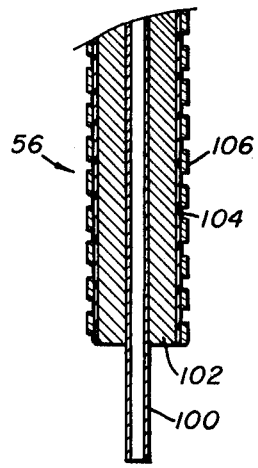
FIG. 4 is a sectional view of the anode tube of the second embodiment of a primary battery.
Figure 3:
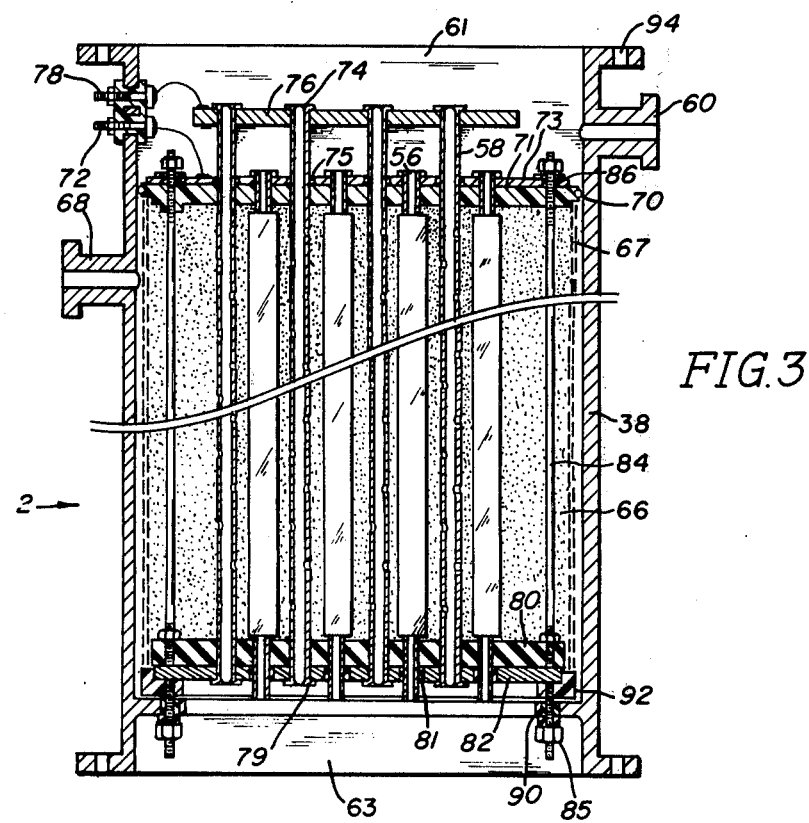
FIG. 3 is a cross section of a power module of a second embodiment of a primary battery.

FIG. 3 is a cross section of a power module of a second embodiment of the primary battery of the invention. In this embodiment of the invention the depolarizer is circulated to the anode 56 and cathode 58 to both generate electrical energy and cool the various elements contained within the power module 2. The cool depolarizer from the cooling means (not shown) enters the power module 2 through an inlet 60 from which it flows into a hollow space 61 within the primary battery. From the space 61 the substance flows into the tops of the plurality of hollow anode tubes 56, and while passing through them, cools them. The details of the anode tube 56 are shown in FIG. 4.

After the substance passes through the anode tubes 56 absorbing the heat of reaction and being preheated thereby, it flows into a second hollow space 63, then into the bottoms of the hollow, perforated cathode tubes 58. As the substance passes through the cathode tubes 58, some of the substance defuses into cathode pellets 66 surrounding the anode 56 and the cathode tubes 58.

The cathode pellets 66 are held in place by a cage 67. The cage 67 is porous and allows the substance to pass through it, and out an outlet 68. When the substance leaves through the outlet 68 it carries the heat of reaction of the primary battery with it to the cooling means (not shown) through the battery outlet pipe (not shown). The remainder of the substance that does not leave through outlet 68 recirculates back through the anode 56 and cathode tubes 58.

A sliding seal 70 surrounds an upper insulator 71 through which the anode 56 and cathode tubes 58 pass. The sliding seal 70, and the insulator 71 prevent the substance from going directly into the cathode pellets 66 when the substance enters the battery.

One end of the anode 56 is welded to an anode current collector 73, which is above the upper insulator 71 and is connected to a terminal 72. One end 74 of the cathode tube 58 passes through the anode current collector 73, but the cathode tube 58 is electrically insulated therefrom by a sleeve 75. This end 74 of the cathode tube 58 is welded to a cathode current collector 76, which is electronically connected to a terminal 78. Another end 79 of the cathode tube 58 passes through a lower insulator 80, and an end plate 82. The anode 56 also passes through the lower insulator 80 and end plate 82 and is insulated by a second sleeve 81 from the end plate 82. The end plate 82 and the anode current collector 73 are held together in a rigid conformation by tie rods 84 and nuts 85. The tie rods 84 are insulated from the anode current collector 73 by an anode sleeve 86, and from the outer shell 88 of the primary battery by a shell sleeve 90. The end plate 82 is insulated from the outer shell 88 by the sliding seal 70 and a retaining ring 92.

Since the anode 56 is held rigidly only at one end by the anode current collector 73, and the cathode tubes 58 are held rigidly only at one end by the cathode current collector 76, both the anode 56 and the cathode tube 58 can slide through the upper 72 and lower 80 insulators respectively, as well as the end plate 82, as their lengths increase or decrease with changes in temperature. The anode tubes 56 and cathode tubes 58 will thus not be affected by thermal stresses. Such thermal stresses would be a factor if the anode 56 and cathode tube 58 are held rigidly at both ends.

The outer shell 88 is shown as a cylinder with open ends. In order for the substance to properly circulate, the two open ends must be closed. This closure can either be supplied by plates (not shown) bolted across the open ends by bolts through bolt holes 94, or by other components of the primary battery system (not shown) bolted to the primary battery through bolt holes 94.

FIG. 4 is a sectional view of the anode tube 56 of the second embodiment of the primary battery shown in FIG. 3. The central tube 100 of the anode 56 is hollow and it is surrounded by a sheet of metal 102. The metal 102 can be selected from the group consisting of alkali and alkaline earth metals. In the preferred embodiment the metal 102 comprises lithium. The metal 102 is surrounded by a porous separator 104, consisting of fiber glass. The separator 104 is in turn surrounded by a retaining screen 106, which is electrically isolated from the central tube 100. The screen 106 consists of a metal that is inert to the substance. When the substance is or contains sulfur dioxide ($SO_2$) a suitable inert metal is aluminum, when the substance is or contains thionyl chloride ($SOCl_2$) a suitable inert metal is nickel.

Figure 5:
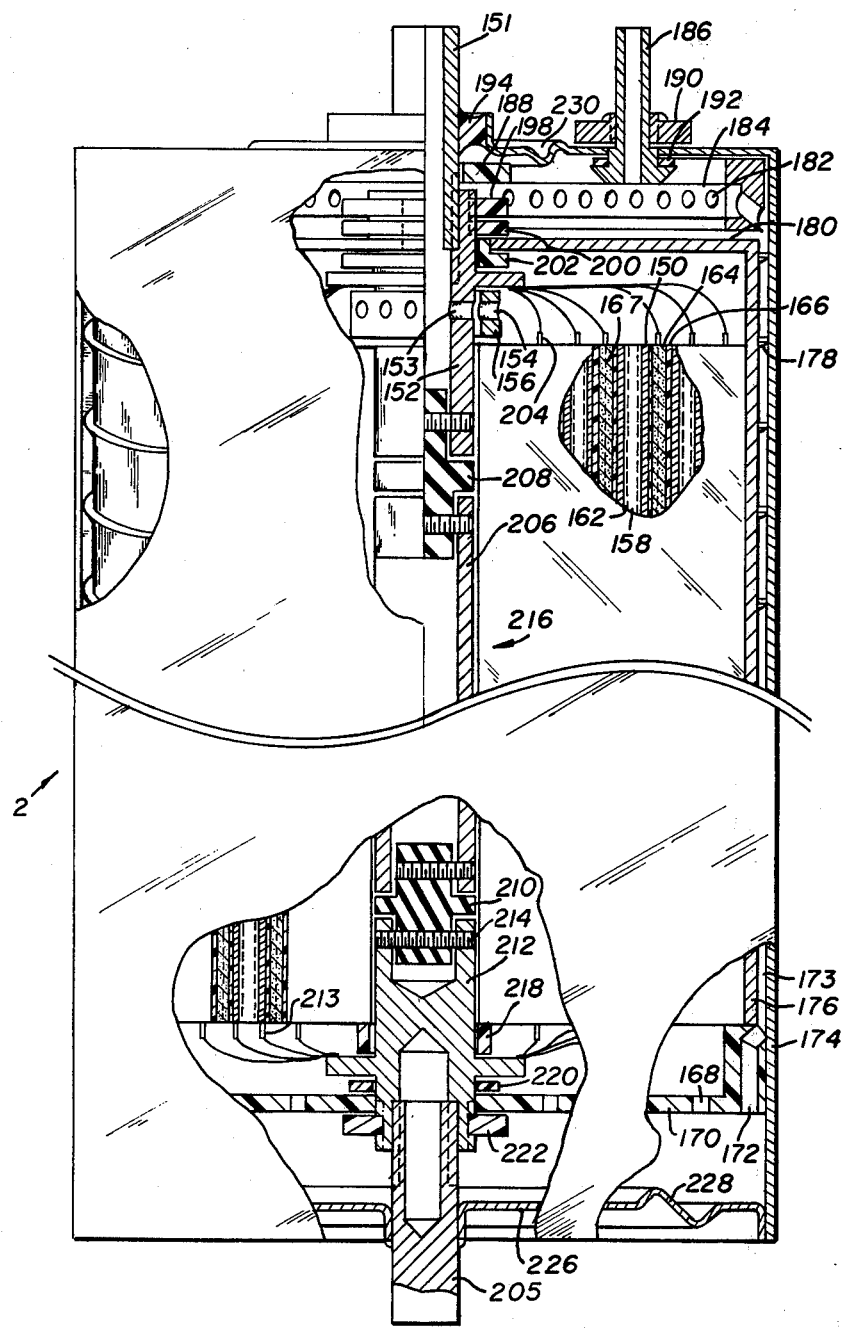
FIG. 5 is a partial sectional view of a third embodiment of a primary battery.

In FIG. 5 we see a partial sectional view of a third embodiment of the present invention. In this embodiment as the others, the depolarizer contacts the anode 150, and the cathode current collector 164, generating electrical energy and heat and then the depolarizer removes the heat generated.

The substance enters the power module 2 through a first hollow tube 151, which tube is also the positive terminal of the primary battery. Hollow tube 151 is connected to a second hollow tube 152. The substance flows from the first hollow tube 151, to the second hollow tube 152, then through a plurality of apertures 153 in the second hollow tube 152 and then though a corresponding set of apertures 154 in a first annular ring 156 surrounding a part of the second hollow tube 152. The substance from there enters a series of nonporous cooling channels 158 that are between a pair of anodes 150, with the cooling channels 158 comprising a corrugated metal sheet 162.

The anode 150 comprises a metal, such as lithium. Each anode 150 directly contacts the cooling channels 158 but is separated from a porous cathode current collector 164 by a porous separator 166. The porous cathode current collector 164 is a flexible porous carbon mass with an embedded current collector 167.

As the substance passes through the cooling channels 158, it absorbs the heat of reaction generated by the power module 2. The hot substance from the cooling channels 158 mixes with the hot substance coming from the porous cathode current collector 164, which substance has just reacted with the anode 150 and passes through a plurality of apertures 168 in a bottom seal 170. The combined hot substances then pass through a passageway 172 in the bottom seal 170. From there the substance passes between an inner surface 173 of an outer shell 174 and an inner shell 176 of the primary battery. As it flows past the outer shell 174, the substance transfers some of its thermal energy to the outer shell 174.

A plurality of baffels 178 between the inner 176 and outer shells 174 increase the velocity of the substance as it circulates and forces the substance past a larger percentage of the surface area of the outer shell 174 during a given period, than without the baffles 178. This in turn increases the amount of thermal energy transferred to the outer shell 174. An upper seal 180, which in this embodiment is part of the inner shell 176, prevents the substance that goes past the baffels 178 from recirculating through the cooling channels 158. The substance instead of recirculating, passes through a plurality of apertures 182 in an upper annular ring 184 and then out through an outlet pipe 186 into pipes (not shown) to the cooling means (not shown). The upper annular ring 184 is held in place by a first washer 188. The outlet pipe is held in place by an exterior seal 190 and an interior washer 192.

The first hollow tube 151 is held in place and insulated from the outer shell 174 by an annular seal 194. This seal 194 also prevents any leakage of the substance around the first hollow tube 151. A second 198, third 200, and fourth washer 202 holds the upper seal 180 in place. These washers 198,200,202 also hold the inner shell 176 in place since the upper seal 180 is an integral part of the inner shell 176.

The tube 152 must be electrically insulated from the inner shell 176. The tube 152 is a cathode current collector, being electrically connected to tabs 204 on each cathode current collector 164. The inner shell 176 can come into electrical contact with the outer shell 174, which shell 174 is electrically connected to a negative battery terminal 205, through the baffels 178. If the inner shell 176 is not insulated from the tube 152 a short circuit would then result.

Tube 152 is separated from a third hollow tube 206 by a first cylindrical insulator 208. A second cylindrical insulator 210 separates the third hollow tube 206 from a fourth hollow tube 212, which fourth tube 212 is directly connected to the negative terminal 205 of the primary battery. The fourth hollow tube 212 further serves as an anode current collector being electrically connected to tabs 213 on the anode 150. The positive terminal 151 and the negative terminal 205 are electrically insulated from each other by the two cylindrical insulators 208 and 210. The first 208 and second 210 cylindrical insulators are held in place by bolts 214 which pass through the respective hollow cylinders 152, 206, 212 and cylindrical insulators 208 and 210.

The second 152, third 206, and fourth 212 hollow tubes with their two cylindrical insulators 208 and 210 combine to form a shaft 216 upon which the cooling channels 158, anodes 150, separators 166 and cathode current collectors 164 are spirally wound. The spiral wound layers are kept in place along the shaft 216 by the first annular ring 156 and a second annular ring 218 located on the fourth hollow tube 212.

The bottom seal 170 is held in place around the fourth hollow tube 212 by a fifth washer 220 and a sixth washer 222. The negative terminal 205 is directly connected to a base 226 of the outer shell 174. The base 226 of the outer shell 174 contains a spring bellows 228, a similar second spring bellows 230 is also located on the top of the battery. The spring bellows 228 and 230 expand and contract with changes within the primary battery. This expanding and contracting action relieves thermal and other stresses within the primary battery and helps keep the outer shell 174 intact.

Figure 6:
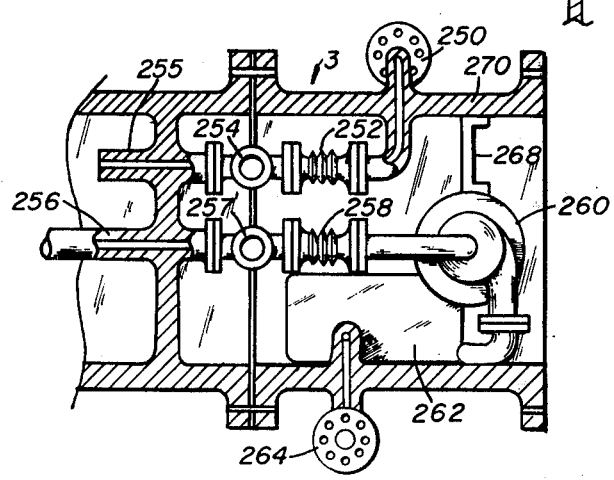
FIG. 6 is a cross section of a pumping means of an embodiment of the invention.

FIG. 6 is a partial cross section of the pumping means located in the hydraulic section 3 of the primary battery. This section 3 pumps the depolarizer throughout the battery. The depolarizer enters through an inlet 250 from the cooling means (not shown), the substance then passes through a first tubular bellows 252, and then through a first valve 254. From the first valve 254, the substance goes to the reservoir (not shown) through a first pipe 255. From the reservoir the substance goes through a second pipe 256, a second valve 257, a second tubular bellows 258 and then into a motor driven pump 260.

The bellows 252 and 258 are in the system to compensate for relative movement within the system. They also will absorb any thermal stresses present, since they can expand or contract without damage to themselves. Further, the bellows 252, 258 allow for easier coupling of the components of the battery system due to the fact that their lengths can easily be changed to fit perfectly between any two components, such as the inlet 250 and the first valve 254.

The valves 254 and 257 can be either manually or electrically operated. In the FIG. 6 they are operated electrically via a solenoid (not shown).

From the pump 260, the substance flows into a filter 262 and then out from the outlet tube 264 to the primary battery (not shown). The pump 260 is supported by a bracket 268 attached to a case 270. Inlet 250, and outlet pipe 264 are also attached to, or are part of the case 270. Similarly the first pipe 255 and the second pipe 256 are attached to and supported by the case 270. From the primary battery the substance returns to the cooling means through a primary battery outlet conduit (not shown).

If the reservoir is not used, the second pipe 256, the second valve 257 and the second bellows 258 are eliminated. The substance would then flow from the cooling means into the inlet pipe 250, through the first bellows 252, the first valve 254, the motor driven pump 260, then into the filter 262 and out the outlet pipe 264 to the primary battery.

Figure 7:
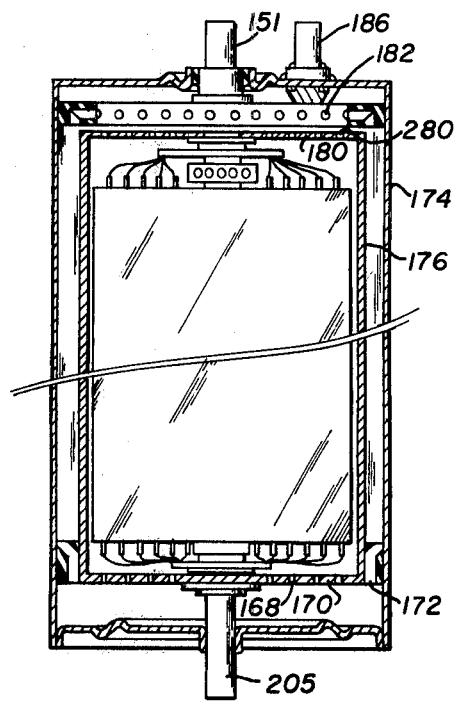
FIG. 7 is a cross section of the third embodiment of the primary battery in which convection currents are used to circulate the depolarizer.

FIG. 7 is a cross sectional view of the third embodiment shown in FIG. 5, but which embodiment has been altered to allow circulation by convection currents. Similar components in FIG. 7 are numbered as in FIG. 5. In the configuration shown in FIG. 7 with the positive terminal 151 at a higher point then the negative terminal 205, the hot substance rises through the cooling channels (not shown). The substance then mixes with any fresh substance that may have been introduced and rises through a plurality of upper seal apertures 280, there some of the substance flows out of the outlet pipe 186, if it is open. If the outlet pipe 186 is not open, the substance exiting from the upper seal aperture 280 combines with and flows along with the rest of the substance through the annular ring aperture 182, then between the inner shell 176 and the outer shell 174. The substance there transfers some of its thermal energy to the outer shell 174, which shell 174 then transfers the thermal energy into the environment through radiation and/or convection. The outer shell in this instance acts as a heat exchanger. The cooled substance then passes through a passageway 172 in the bottom seal 170.

The cooled substance that is located below the bottom seal 170 is forced by the sinking substance which has just cooled, through apertures 168 in the bottom seal 170 and into the cooling ducts (not shown). If the negative terminal 205 is higher than the positive terminal 151, the same convection currents flow but in the opposite direction.

From FIG. 7 it can be seen that the flow of the substance by means of convection currents is in an opposite direction to the flow set up by means of a mechanical pump. Convection currents can only be used where there is little or no substance being added through the positive terminal 151, since most of the new substance entering the battery will go through the upper seal apertures 280 and out the outlet tube 186, instead of through the cooling ducts.

Figure 8:
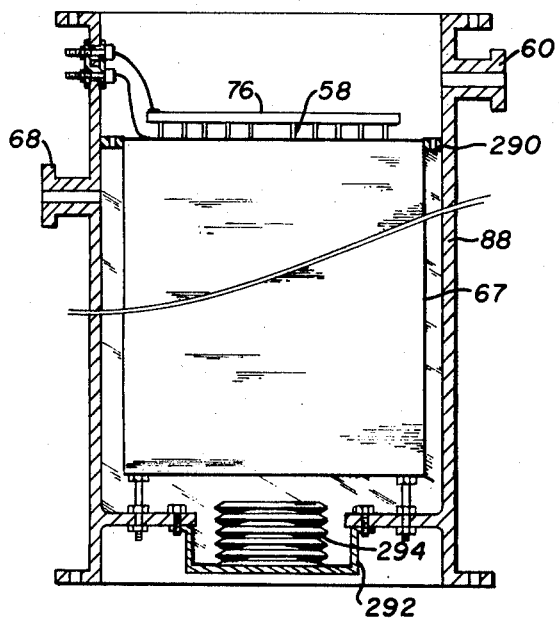
FIG. 8 is a cross section of a primary battery containing a sealed bellows.

FIG. 8 is a cross sectional view of the embodiment shown in FIG. 3, but which has been altered to allow circulation by convection currents and which contains a sealed bellows 294. This has been accomplished by altering the sliding seal 70 of FIG. 3, to produce a partially open seal 290 which allows the substance to pass through it. Similar components in FIG. 8 are numbered as in FIG. 3.

In the configuration shown in FIG. 8 the cathode current collector 76 is higher than bottom plate 292. The substance absorbs the heat of reaction of the primary battery and rises in both the perforated hollow cathode tubes 58 and the hollow anode tubes (not shown). As the substance rises it absorbs more heat. After rising out of the anode tubes and cathode tubes 58, the substance mixes with any fresh substance that may have entered through the inlet 60. The substance then flows between the outer shell 88 and the cage 67, giving up its thermal energy to the outer shell 88. Some of the substance may also flow out through the outlet 68. The cooled substance then sinks and reenters the anode tubes and cathode tubes 58, wherein it again absorbs the heat of reaction.

Convection currents are set in motion when the rising hot substance forces the substance above it through the partially open seal 290, and then between the cage 67 and outer shell 88, while the sinking cool substance forces the substance below it up the anode tubes and cathode tubes 58. The flow of substance through the anode tubes by means of convection currents is opposite of that present when a mechanical pump is used. The flow of the convection currents will also be reversed if the bottom plate 292 is above the cathode tubes 58.

FIG. 8 further shows an expandable means located within the outer shell of the primary battery adapted to maintain a substantially constant pressure within the system. In the preferred embodiment shown in FIG. 8 the expandable means is a sealed bellows 294 within the primary battery. The bellows 294 can be located anywhere within the primary battery system including the primary battery and the reservoir. In FIG. 8 it is shown located below the end plate (not shown), and above the bottom plate 292. The bottom plate 292 is attached to part of the outer shell 88 of the primary battery.

The sealed bellows 294 is filled with a low vapor pressure liquid such as a volatile ether, sulfur dioxide, isobutane, propane, or a mixture of the latter two. When a part of the substance is consumed, and no fresh substance is introduced, the volume of the substance within the primary battery is reduced with a concurrent reduction of pressure within the battery. The decrease in pressure allows the liquid within the sealed bellows 294 to evaporate and expand the bellows 294 thereby keeping the pressure of the substance constant within the primary battery.

The sealed bellows 294 can also contain a spring (not shown) instead of, or along with, the low vapor pressure liquid. The spring will help the sealed bellows 294 expand as the volume of substance decreases.

The preceding figures were for illustrative purposes only. It is understood that changes and variations can be made without departing from the spirit and scope of the present invention as defined in the following claims.

What is claimed is:

1. A method for cooling a high rate discharge primary batery having an anode comprised of a metal selected from the group consisting of alkali and alkaline earth metals and aluminum, having a cathode current collector, having internal heat generation and subject to thermal runaway comprising the steps of absorbing the heat of reaction of the primary battery with a substance which is a nonaqueous liquid depolarizer and electrolyte solvent containing a dissolved electrolyte, which substance consists of a material selected from the group consisting of liquid oxyhalides, liquid nonmetallic oxides, liquid nonmetallic halides and mixtures thereof; removing the substance from the site of heat generation within the primary battery to a cooling means; cooling the substance; and recycling the substance to the site of heat generation within the primary battery.

2. The method of claim 1 wherein the substance absorbs sufficient thermal energy from the primary battery to prevent thermal runaway of the primary battery.

3. The method of claim 1 wherein from about 1000 calories to about 9000 calories are removed from the primary battery per ampere hour of primary battery capacity.

4. The method of claim 1 wherein the primary battery has a capacity of from about 100 ampere hours to about 10,000 ampere hours.

5. The method of claim 1 wherein the substance simultaneously reacts, generating heat at the sites of heat generation, and removes the heat from the sites of heat generation.

6. The method of claim 1 wherein the anode comprises lithium and the substance comprises thionyl chloride.

7. A primary battery system comprising a primary battery having a casing and at least one high rate discharge primary cell therein; each of said cells comprising an anode selected from the group consisting of alkali and alkaline earth metals and aluminum, a cathode current collector, a separator between the anode and the cathode collector, and a substance which is a nonaqueous liquid depolarizer and electrolyte solvent containing a dissolved electrolyte, which substance consists of a material selected from the group consisting of liquid oxyhalides, liquid nonmetallic oxides, liquid nonmetallic halides, and mixtures thereof; means for cooling the substance; and fluid communication means operatively positioned between the primary battery and the cooling means to enable the substance to circulate between the primary battery and the cooling means.

8. The primary battery system of claim 7 wherein the anode is lithium.

9. The primary battery system of claim 7 wherein the substance is selected from the group consisting of $SO_2$, $SO_3$, $VOCl_3$, $CrO_2Cl_2$, $SO_2Cl_2$, $NO_2Cl$, $NOCl$, $NO_2$, $SeOCl_2$, $POCl_3$, $SOCl_2$, $S_2Cl_2$, and $S_2Br_2$.

10. The primary battery system of claim 7 wherein the substance is $SOCl_2$ and a cosolvent selected from the group consisting of $SO_2$, $SO_3$, $VOCl_3$, $CrO_2Cl_2$, $SO_2Cl_2$, $NO_2Cl$, $NOCl$, $NO_2$, $SeOCl_2$, $POCl_2$, $S_2Cl_2$, and $S_2Br$.

11. The primary battery system of claim 7 wherein said means for cooling the substance comprises a heat exchanger.

12. The primary battery system of claim 7 wherein said casing comprises the outer shell of said system.

13. The primary battery system of claim 12 and further comprising a plurality of fins attached to the outer surface of the outer shell of said system.

14. The primary battery system of claim 12 wherein said fluid communication means comprises passageways leading from the anode and cathode current collector towards and along an inner surface of the outer shell of the primary battery and leading back from the inner surface of the outer shell to the anode and cathode current collector.

15. The primary battery system of claim 7 wherein said fluid communication means includes a primary battery outlet conduit connecting the primary battery and the cooling means; and means operatively connected between the cooling means and the primary battery to circulate the substance throughout the primary battery system.

16. The primary battery system of claim 15 wherein said means to circulate includes pump means, filter means, valve means, and means for compensating for relative movement within the system.

17. The primary battery system of claim 16 wherein said means for compensating for relative movement within the system comprises a bellows.

18. The primary battery system of claim 7 wherein the anode comprises a plurality of single leaf disks containing a central hole; the cathode current collector comprises a plurality of double leaf disks containing a central hole; and wherein the primary battery system further includes a flow channel in between the leaves of each double leaf cathode current collector; an interelectrode hydraulic guide between the separators and the anodes; a master anode collector located on the periphery of the circular disk anodes and electronically connected to each anode; and a conduit that passes through the central hole of the alternating anodes, separators and cathode current collectors, the conduit acting as a second cathode current collector being electrically connected to the cathode current collectors and insulated from the anodes, and being a carrier of the substance to the flow channel in between the leaves of each double leaf cathode current collector.

19. The primary battery system of claim 7 wherein the anode comprises a plurality of single leaf disks containing a central hole; the cathode current collector comprises a plurality of double leaf disks containing a central hole; and wherein the primary battery system further includes a flow channel in between the leaves of each double leaf cathode current collector; an interelectrode hydraulic guide between the separators and the anodes; a master cathode collector located on the periphery of the double leaf disk cathode current collectors and electrically connected to each cathode current collector; and a conduit that passes through the central hole of the alternating anodes, separators and cathode current collectors, the conduit acting as a second anode current collector being electrically connected to the anodes and insulated from the cathode current collectors, and being a carrier of the substance to the flow channel in between the leaves of each double leaf cathode current collector.

20. The primary battery system of claim 7 wherein the anode comprises at least one hollow tube substantially covered by a metal; the cathode current collector comprises at least one perforated hollow tube; and wherein the primary battery system further includes a master anode collector having a first end of each hollow anode and cathode tube passing through it, with the anode tube electrically connected to it and the cathode tube electrically insulated from it; an end plate having a second end of each hollow anode and cathode tube passing through it, with the anode tube insulated from it; a master cathode collector being electrically connected to the hollow cathode tubes and having the first end of each hollow cathode tube passing through it; a bed of cathode pellets surrounding the anode and cathode tubes; an outer shell encasing the primary battery system; and means between the master anode collector and outer shell that prevents the substance entering the battery from directly mixing with the substance around the cathode pellets, the means forcing the substance to flow through the hollow tubes of the anode into the perforated cathode tubes and into the cathode pellets.

21. The primary battery system of claim 20 further comprising a porous separator covering the metal, and a screen holding the porous separator in place which is electrically isolated from the anode.

22. The primary battery system of claim 21 wherein the porous separator comprises fiberglass, and the screen comprises a metal inert to the substance.

23. The primary battery system of claim 20 wherein the means to prevent the substance entering the battery from directly mixing with the substance around the cathode pellets is partially open providing a path for convection currents to circulate the substance from the anode and cathode current collector past the outer shell of the primary battery, back to the anode and cathode current collector, whereby thermal energy can be exchanged between the substance and the outer shell of the primary battery.

24. The primary battery system of claim 7 wherein the anode is comprised of at least two layers of anode material with a plurality of channels between the layers; and wherein the primary battery system further includes a shaft around which the anode with channels, cathode current collector and separator have been wound in a spiral manner; a master cathode current collector on the shaft electrically connected to the cathode current collector; an anode current collector on the shaft electrically connected to the anodes, a plurality of baffles surrounding the wound anode and cathode current collector that increases the velocity of the substance flowing past; an outer shell surrounding the baffles which absorbs thermal energy from the substance flowing past; and means to prevent the substance flowing past the baffles from recirculating through the channels.

25. The primary battery system of claim 24 wherein the means to prevent the substance from recirculating through the channels is partially open providing a path for convection currents to circulate the substance from the anodes and cathode current collectors, past the baffles and outer shell of the primary battery, back to the channels between the anodes.

26. The primary battery system of claim 25 and further comprising means operatively located within the outer shell to curculate the substance throughout the primary battery system.

27. The primary battery system of claim 7 and further comprising a sealed expandable means located within the outer shell of the primary battery adapted to maintain a substantially constant pressure within the system.

28. The battery system of claim 7 wherein at least two primary batteries are electrically connected in series and located within a single outer shell.

* * * * *